Aug. 14, 1956  K. RABE  2,758,680
INTERNALLY EXPANDING SHOE BRAKES
Filed Jan. 12, 1952

INVENTOR
Karl Rabe

BY
ATTORNEYS

# United States Patent Office 2,758,680
Patented Aug. 14, 1956

2,758,680

INTERNALLY EXPANDING SHOE BRAKES

Karl Rabe, Stuttgart, Germany, assignor to Dr. Ing. h. c. F. Porsche K. G., Stuttgart-Zuffenhausen, Germany Application January 12, 1952, Serial No. 266,155

Claims priority, application Austria February 1, 1951

4 Claims. (Cl. 188—152)

This invention relates to improvements in shoe type internally expanding brakes and more particularly to a hydraulically operated brake of the type including a brake drum, a pair of brake shoes mounted therein and mechanism for expanding the brake shoes.

In hydraulic brakes of this type, the hydraulic brake cylinder is generally arranged inside the brake drum between the ends of the brake shoes. While this arrangement provides a relatively simple construction, it causes considerable heating of the braking mechanism because of the heat developed by the brake shoes. Furthermore, in brakes of this type, it is difficult to provide mechanism for mechanically actuating the brake shoes. In other forms of shoe brakes where the hydraulic cylinders are arranged outside the brake drums, however, no simple and convenient mechanism has been provided for transmitting the braking force to the brake shoes in the drum.

The primary object of the invention is, therefore, to provide a brake construction of the type referred to in which the hydraulic cylinder for actuating the brake shoes is mounted outside the brake drum and a relatively simple and effective mechanism is provided for expanding the brake shoes upon actuation of the piston in the hydraulic cylinder.

A further object of the invention is to provide a simplified brake shoe-expanding mechanism which includes relatively simple and inexpensive parts which are readily assembled.

According to the invention, the mechanism for expanding the brake shoes in the brake drum comprises a pair of expanding thrust members arranged between the brake shoes respectively having an end engaging the respective brake shoes. Relative movement of these expanding members is accomplished by providing a two-armed lever, i. e. a lever pivoted intermediate its ends to one of said pair of members and having one end engaging the other thrust member. The other end of said two-armed lever extends outside the brake drum, through a sheet metal brake carrier and is arranged to be actuated by the piston of a hydraulic cylinder mounted on the brake carrier.

In a preferred form of construction, the brake shoe-expanding mechanism comprises a pair of aligned overlapping thrust members including channel-shaped or U-shaped portions with the U-shaped portion of one member fitting within the U-shaped portion of the other member. In this construction, the thrust members in cooperation with the two-armed lever are maintained in engagement and in guided alignment with each other. In this construction, the two-armed lever preferably extends between the side webs of one of said pair of thrust members and is pivoted thereto by a pivot pin held in place by the side webs of the other member. One end of the two-armed lever includes a notched or hooked portion engaging the other of said members. When the opposite end of the two-armed lever is actuated, force is applied against the pivot pin and also against the member engaged in the notch, so that relative movement of the members is effected and the brake shoes are expanded into engagement with the brake drum.

In the arrangement as described, the shoe-expanding mechanism requires very little space and only three simple structural parts, the two expanding thrust members and the two-armed lever. The three elements in cooperation provide a self-guiding floating expanding mechanism, which is advantageously combined with the hydraulic cylinder outside the brake drum. In this construction, the hydraulic piston in the hydraulic cylinder advantageously includes means for attaching a pull cable whereby the arm of the two-armed lever engaged by the piston may be actuated either by a fluid-pressure medium or by a manually-operated mechanical means.

The improved brake construction, according to the invention includes other features, objects and advantages described more in detail hereafter in connection with the accompanying drawings illustrating one constructional form of the invention by way of example.

Figure 1:
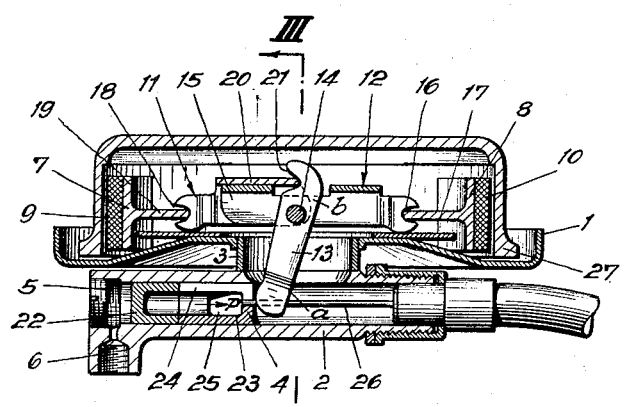
Fig. 1 is a cross-sectional fragmentary view taken on the line I—I of Fig. 2, through a hydraulically-operated shoe brake of the type included in power-driven vehicles and showing a brake shoe expanding mechanism constructed according to the invention.

Referring to the drawings, the brake mechanism shown therein includes a backing plate or sheet metal brake carrier plate 1 to which a brake cylinder 2 is fixed by means of a support 3. A piston 4 is mounted in the brake cylinder and actuated therein by a fluid-pressure medium introduced into the space 5 through a pipe connection 6.

The brake carrier 1 is associated with a brake drum 27 in a conventional arrangement, the brake drum being normally arranged for the attachment of a vehicle wheel as in usual practice. The braking mechanism includes curved brake shoes 7 and 8 on which linings 9 and 10 are respectively mounted. Expansion of the brake shoes 7 and 8 in the drum 27 is effected by means of two expanding thrust members 11 and 12 and a two-armed lever 13. The thrust member 12 and actuating lever 13 are provided with aligned bores in which a pivot pin 14 is mounted for pivoting and supporting the lever 13 intermediate its ends.

The member 12 includes a channel-shaped portion or portions, as shown, the side webs 15 of which serve as guides engageable by the side webs of the channel-shaped portion of the member 11. The member 12 is also provided with a notch 16 which bears against the flange 17 of the brake shoe 8. The flange 17 may also be provided with a notch for receiving the notch 16 of the member 12. The expanding member 11 is provided with a notch 18 by which it bears against a flange 19 of the brake shoe 7, which also may be notched to receive the notch 18. The member 11 includes a channel-shaped portion, the side webs of which fit along the outside of the webs 15, and a back web or guide portion 20 slidably resting on the upper surface of a portion of the thrust member 12 to the left of the lever 13, as shown in Fig. 1.

The lever 13, which is pivoted intermediate its ends between the side webs of member 12 on the pivot pin 14, comprises a longer arm $a$ extending laterally through the tubular support 3 into the cylinder 2, and a shorter arm $b$ provided with a notch 21, which is arranged in engagement over the top outer edge portion of the member 11. The cylinder 2 is cut away opposite the tubular support 3 and the end of the arm $a$ extends therethrough and bears against the end of the piston 4.

When the piston 4 is moved to the right in Fig. 1, the actuating lever 13 tends to rotate counterclockwise, and, by the engagement of notch 21 with the top web 20 of thrust member 11, tends to press the outer thrust member 11 downwardly into sliding engagement with the inner thrust member 12. This action, combined with the arrangement of a portion of the inner thrust member 12 in the channel portion of the outer thrust member 11, aids in maintaining the thrust members 11 and 12 in slidable aligned engagement between the flanges of the brake shoes.

Figure 2:
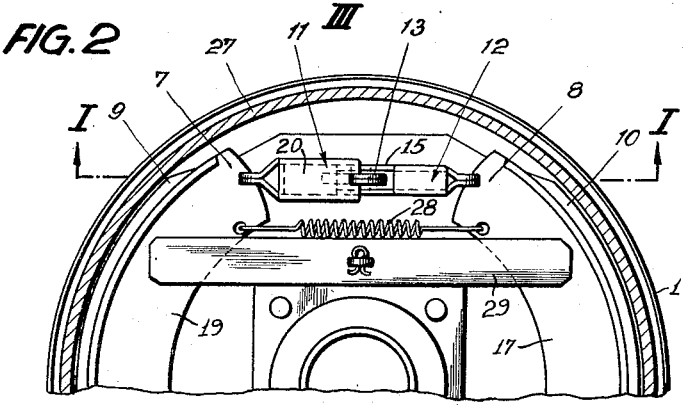
Fig. 2 is a sectional view of the brake mechanism shown in Fig. 1, taken through the rim of the brake drum outside the brake shoe expanding mechanism.
Figure 3:
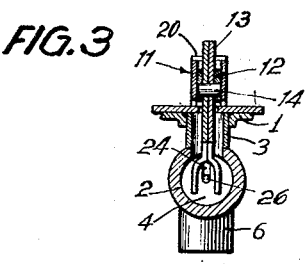
Fig. 3 is a broken sectional view taken on the line III—III of Fig. 1.

The thrust members 11 and 12 and the actuating lever 13 are advantageously stamped and formed from sheet metal to provide the structures shown in the drawings, the top web of the member 12 being cut away to accommodate the arm $b$ of the lever 13. The three members in general comprise two thicknesses of sheet metal. At the extreme ends of members 11 and 12 the top web is cut away and the side webs pressed together as seen in Fig. 2. At the end of the arm $a$ the two thicknesses of metal are separated to provide a fork through which the cable 26 extends, as seen in Fig. 3. The side webs of the member 11 extend over the ends of the pin 14 to hold it in place, as shown in Figs. 1 and 3.

In Fig. 1 the braking force, represented by P, applied by the piston 4 against the arm $a$ of the lever 13 is transmitted to the brake shoe 7 and may be represented as amounting to $$P\frac{a}{b}$$

while the force acting on the brake shoe 8 may be represented as amounting to $$P\left(1+\frac{a}{b}\right)$$

$a$ and $b$ representing the effective lengths of the respective arms. Through the differential distribution of the braking force, in which, in a particular example, the brake shoe 7 acting as a servo-shoe produces about 2.6P and the brake shoe 8 about 3.6P, a more uniform wear of the brake linings is ensured.

In a preferred construction, the hydraulic piston 4 comprises two parts which are separate from each other which act more or less independently, that is a plunger 22 and a guide-piece 23. The guide-piece 23 is of hollow construction and is cut away at 24 for receiving a lug 25 carried on the end of a pull cable 26, which may extend to a hand brake lever. The lug 25 is wider than the diameter of the cable 26 and is arranged to be pushed through the slot 24 into the guide-piece 23 and seated therein in the manner shown. By arranging the structure of the hydraulic cylinder in this manner, it is possible to operate the brake mechanism both hydraulically and mechanically.

When pressure medium is forced into the cylinder 2, through the inlet connection 6, the plunger 22 and the guide-piece 23 are forced to the right in Fig. 1. In this operation, the lever 13 is turned counterclockwise about the pivot pin 14 and also moved bodily to the right in Fig. 1 to the extent that the thrust member 12, carrying the pin 14, is moved to the right. Through the lateral body displacement of the lever 13, the thrust member 12 to which it is pivoted, is also displaced to the right and forces the brake shoe 8 against the drum 27. Simultaneously through the rotation of the lever 13 about the pivot pin 14, the expanding thrust member 11 is displaced to the left in Fig. 1 and presses the brake shoe 7 against the brake drum 27. The same operations take place when the hand brake of the vehicle is actuated and the pull cable 26 is drawn to the right in Fig. 1. However, in this operation, the guide-piece 23 of the piston is drawn to the right without the plunger 22. The lever 13 is actuated by cable 26 in the same manner as if it were actuated hydraulically.

From the showing in Figs. 1 and 2 it will be understood that the braking mechanism is located above the axle of the vehicle and that the lever 13 extends generally parallel to the vehicle axle or at about right angles to the face of the brake drum. The conventional return spring 28 for the brake shoes is shown in Fig. 2, and also a shoe retaining bar 29.

The mechanism according to the invention comprises a compact arrangement of three cooperating elements which are mounted in a floating manner without fixed pivoting support, with the lever 13 extending in a novel manner to an outside-mounted hydraulic cylinder. Furthermore, the mechanism is effectively sealed by the arrangement of the cut-away cylinder, the tubular support 3 and the carrier plate 1 in the manner shown and described.

I claim:

1. In a brake mechanism for power driven vehicles, including a brake drum and a pair of expansible brake shoes in the drum, a self-guiding floating mechanism for expanding the brake shoes into engagement with the brake drum comprising a pair of thrust members and an actuating lever carried and supported by the thrust members, said pair of thrust members being arranged in overlapping sliding engagement longitudinally with each other between the brake shoes with one end of each thrust member engaging the respective brake shoes, said actuating lever being pivoted intermediate its ends directly to one of said thrust members in a fixed pivoting position thereof and having one of its end portions operatively engaged with the other of said pair of thrust members in such a manner as to retain said pair of thrust members in direct sliding engagement longitudinally with each other, and means operatively associated with the other end of said actuating lever for rocking it on its pivot with said one thrust member and thereby effecting relative movement of said pair of overlapping thrust members longitudinally with respect to each other including the displacement of said pivot to in turn expand said brake shoes into engagement with the brake drum.

2. A brake as claimed in claim 1, in which said actuating lever is pivoted to said one thrust member by means of a pivot pin extending through the said thrust member and lever, and means carried by the other of said pair of thrust members extending over the ends of said pivot pin to thereby retain said pivot pin in its normal operative position.

3. In a brake for power driven vehicles, including a brake drum, and a pair of brake shoes in the drum, a self-guiding floating mechanism for expanding the brake shoes into engagement with the drum comprising a pair of telescoping thrust members extending between the brake shoes having ends respectively in engagement with the brake shoes, an actuating lever pivotally secured intermediate its ends to the inner of said telescoping thrust members and supported by the thrust members, said actuating lever having one of its end portions operatively engaging with the outer of said thrust members in such a manner as to retain said pair of thrust members in sliding engagement with each other, means for moving the other end of said actuating lever for effecting relative endwise movement of said thrust members and for expanding the brake shoes into engagement with the drum.

4. In a brake mechanism for power driven vehicles, including a brake drum and a pair of expansible brake shoes in the drum, a self-guiding floating mechanism for expanding the brake shoes into engagement with the brake drum comprising a pair of thrust members and an actuating lever carried thereby, each of said thrust members including a channel-shaped portion, said pair of thrust members being arranged in aligned overlapping engagement with each other between the brake shoes with one end of each thrust member engaging the respective brake shoes, said actuating lever extending between the side webs of the channel-shaped portion of one of said thrust members, a pivot pin extending through said side webs and through the actuating lever intermediate its ends, one end portion of the actuating lever operatively engaging with the other of said pair of thrust members in such a manner as to retain said pair of thrust members in sliding engagement with each other, the channel-shaped portion of the other thrust member embracing said channel-shaped portion carrying said pivot pin in an engaging relationship adapted to retain the pivot pin in position in the said side webs and actuating lever, and means operatively associated with the other end of said actuating lever for rocking it on its pivot and thereby effecting relative longitudinal movement of said pair of overlapping thrust members including the displacement of said pivot pin to in turn expand said brake shoes into engagement with the brake drum.

References Cited in the file of this patent

UNITED STATES PATENTS

| | | |
|---|---|---|
| 2,002,006 | Hall | May 21, 1935 |
| 2,109,114 | Kerr | Feb. 22, 1938 |
| 2,118,188 | Gallup | May 24, 1938 |
| 2,161,640 | Schnell | June 6, 1939 |
| 2,192,001 | Bolster | Feb. 27, 1940 |
| 2,351,952 | Goepfrich | June 20, 1944 |

FOREIGN PATENTS

| | | |
|---|---|---|
| 642,991 | Great Britain | Sept. 13, 1950 |